United States Patent [19]
Heinrich

[11] Patent Number: 5,159,482
[45] Date of Patent: Oct. 27, 1992

[54] COIL ARRANGEMENT FOR AN OPTICAL SCANNER AND OPTICAL SCANNER PROVIDED WITH SUCH A COIL ARRANGEMENT

[75] Inventor: Norbert Heinrich, Vienna, Austria

[73] Assignee: U. S. Philips Corporation, New York, N.Y.

[21] Appl. No.: 557,893

[22] Filed: Jul. 25, 1990

[30] Foreign Application Priority Data

Jul. 26, 1989 [AT] Austria ............................ A1809 89

[51] Int. Cl.5 .................... G02B 26/08; H02K 1/04
[52] U.S. Cl. ................................... 359/199; 310/43
[58] Field of Search ........................... 359/199–200, 359/213, 824; 310/36, 43, 46, 194, 208; 369/44.15, 44.18

[56] References Cited

U.S. PATENT DOCUMENTS 3,780,323 12/1973 Swain ..................................... 310/43
4,473,274 9/1984 Yano et al. .......................... 359/824

Primary Examiner—Bruce Y. Arnold
Assistant Examiner—James Phan
Attorney, Agent, or Firm—David R. Treacy

[57] ABSTRACT

In a coil arrangement which is provided for use in an optical scanner and which has a supportlessly wound first coil (1), to the circumference of which there is attached at least one second coil (4), the axis (7) of the second coil thereby running essentially perpendicular to the circumference of the first coil, it is provided that a plastic jacket (9) is injection-moulded around the circumference of the first coil and that, in the plastic jacket, on the outside in relation to the first coil, at least one coil chamber (10, 11) is formed, which in its cross-section is designed in the form of a channel, at least in certain sections, and in which the second coil is accommodated.

4 Claims, 2 Drawing Sheets

COIL ARRANGEMENT FOR AN OPTICAL SCANNER AND OPTICAL SCANNER PROVIDED WITH SUCH A COIL ARRANGEMENT

BACKGROUND OF THE INVENTION

1. Field of the Invention

The invention relates to a coil arrangement for an optical scanner, which arrangement has a supportlessly wound first coil, to the circumference of which there is attached at least one further coil, the axis of which thereby runs essentially perpendicular to the circumference of the first coil.

2. Description of Related Arts

Optical scanners are used for the scanning of an information track on an optical recording carrier, their lens system on the one hand being focused on an information track and on the other hand being set, in a direction transverse to the information track, to the track centre, for which purpose on the one hand a scanning setting of the lens system in relation to the optical recording carrier is necessary and on the other hand an adjusting movement of the lens system in a direction transverse to the information track is necessary. Accordingly, the lens system of such an optical scanner is arranged on an adjustable mount, which can perform the two abovementioned movements. A coil arrangement, which interacts with a magnet system, serves for the generation of such movements, the coil arrangement being fed electric control signals, as a result of which relative movements between the coil arrangement and the magnet system are effected and these are then transmitted to the mount of the lens system.

A coil arrangement of the generic type specified at the beginning, such as is known, for example, from an optical scanner described in German Offenlegungsschrift 3,831,425, has for this purpose a supportlessly wound first coil which is designed rectangularly in cross-section perpendicular to its coil axis and to which there are attached on one of its longer circumferential sides two flatly designed, likewise supportlessly wound further coils, which in practice is accomplished by an adhering operation. The production of such a coil arrangement is relatively complicated and very tricky, since the coils used are wound from a very thin wire and are relatively small, an adhering operation also being necessary in addition, which is well known often to entail difficulties, in particular in mass production. In addition, the stability of such a coil arrangement is relatively low, since the coils used are supportlessly wound, as a result of which difficulties may likewise arise during the course of production of an optical scanner, on which particular accuracy requirements are made.

SUMMARY OF THE INVENTION

The invention has set itself the object of designing a coil arrangement of the generic type specified at the beginning in such a way that the abovementioned difficulties are avoided, to the extent that the coil arrangement has a stable construction and no adhering operation is necessary. According to the invention, it is provided for this purpose that a plastic jacket is injection-moulded around the circumference of the supportlessly wound first coil, at least one coil chamber being formed in the plastic jacket, on the outside in relation to the first coil which chamber in its cross-section is designed in the form of a channel, at least in certain sections, and in which chamber the further coil is accommodated. In this way it is achieved that, by providing a plastic jacket for the first coil, on which a coil chamber designed in the form of a channel for the further coil is formed, both the first coil and the further coil are given good stability, no additional measures, such as an adhering operation or the like, being necessary for the attachment of the further coil to the first coil, since this further coil can be wound directly into the coil chamber provided for it. As evident, the production of such a coil arrangement turns out to be very simple and reliable, such a coil arrangement also being very well suited for mass production. Furthermore, a risk of damaging the coil arrangement during the course of its further use is also prevented to the greatest extent.

It has proved particularly advantageous hereby if the first coil is designed as a cylinder coil and the further coil is designed as a saddle coil. In this way, a very compact coil arrangement is obtained, which makes it possible to construct a magnet system interacting with it with a relatively small air gap, since the first coil is cylindrically constructed and the further coil, due to its design as a saddle coil, is adapted to the cylindrical circumference of the first coil. Such a coil arrangement therefore produces good efficiency in interaction with a magnet system.

For example, the coil chamber for the further coil, designed as a saddle coil, could be designed in such a way that it is bounded all around by an outer wall of the plastic jacket, running parallel to the first coil designed as a cylinder coil, and, for example, thereby has a self-contained oval channel-shaped form. However, it has proved particularly advantageous if the coil chamber for the further coil, designed as a saddle coil, has two straight channel-shaped sections, which run parallel to the axis of the first coil, designed as a cylinder coil, and are formed by channels which in their cross-section run in the form of secants to the cylinder coil. In this way, the plastic jacket together with the coil chamber formed on it is particularly simple to produce with respect to the mould, regarding demouldability, and the further coil is simple to wind.

Furthermore, the invention relates to the use of a coil arrangement, designed according to the invention, in an optical scanner for scanning an information track on an optical recording carrier. An optical scanner using a coil arrangement designed according to the invention has proved simple in production, in particular mass production, and very reliable, since the coil arrangement has a stable construction and consequently is not prone to damaging effects in particular. Such an optical scanner also has very good setting properties to an information track, since the coil arrangement can be constructed compactly and therefore can interact with good efficiency with a magnet system.

BRIEF DESCRIPTION OF THE DRAWINGS

The invention is explained in further detail below with reference to the drawings, in which an exemplary embodiment of the invention is represented.

DETAILED DESCRIPTION OF THE PREFERRED EMBODIMENTS

Figure 1:
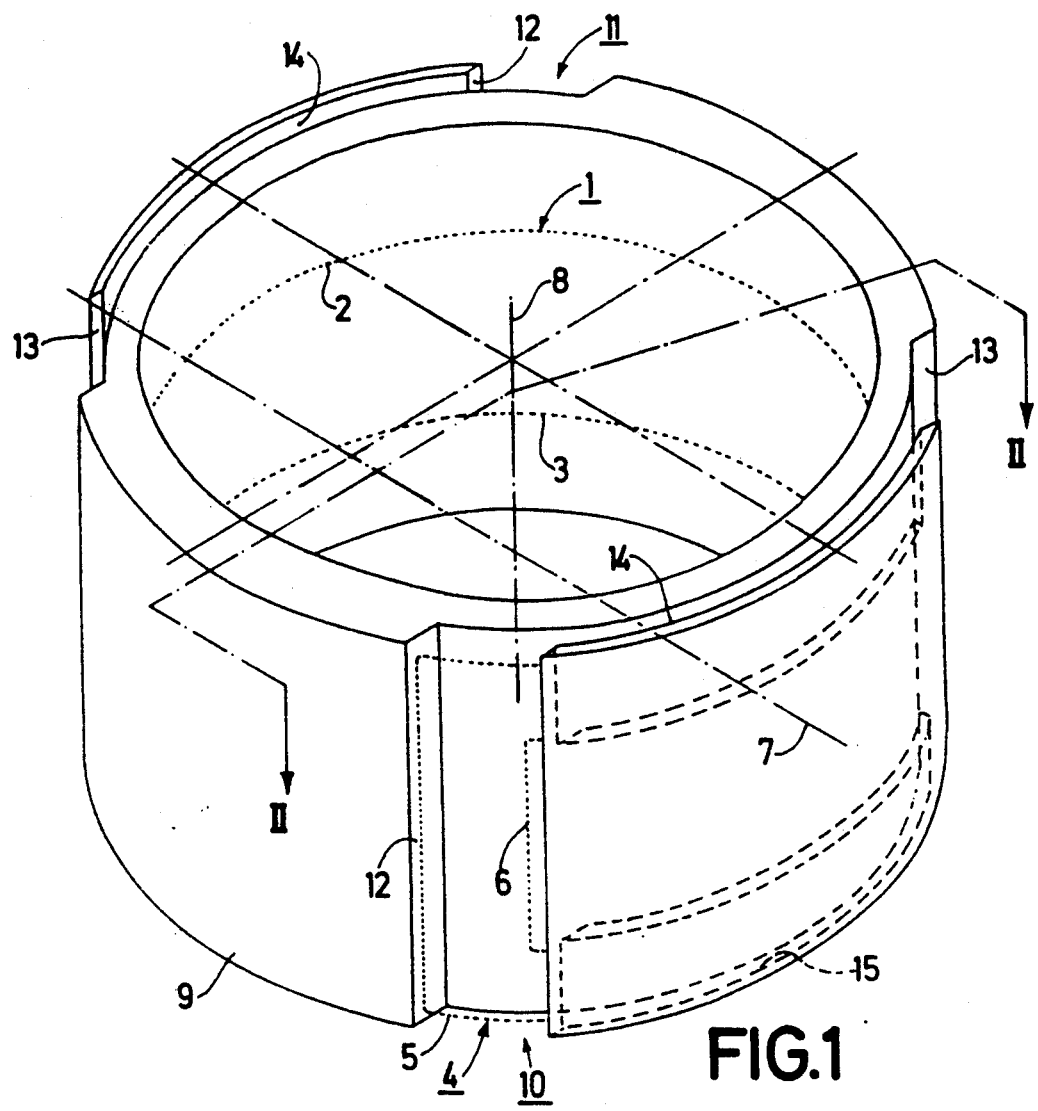
FIG. 1 shows, in axonometric representation, a coil arrangement, in which a first coil is designed as a cylinder coil and two further coils, of which only one is directly visible in the manner of representation of FIG. 1, are designed as saddle coils, the coils in themselves only being indicated schematically by dotted lines for the sake of clarity, and obscured edges only being drawn in the case of one coil chamber.
Figure 2:
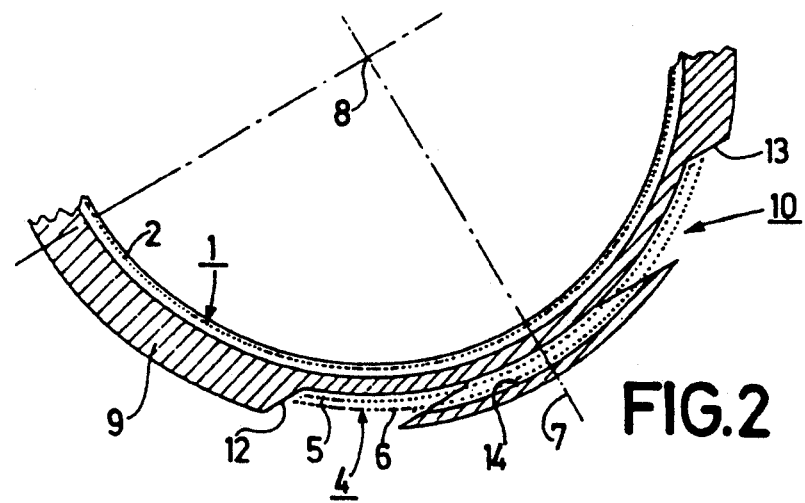
FIG. 2 shows a partial section according to the line II—II in FIG. 1.

In FIGS. 1 and 2, a coil arrangement for an optical scanner, not represented here in any further detail, is shown, which serves for the scanning of an information track on an optical recording carrier, such as for example a so-called compact disc, its lens system, arranged on an adjustable mount, both being focused on an information track and set to the track centre of the latter by means of the coil arrangement in question here, interacting with a magnet system. In the present case, the coil arrangement consists of a first coil 1, which is designed as a cylinder coil and is schematically indicated by the dotted lines 2 and 3, and of two further or second coils 4, which are diametrically opposite each other on the circumference of the first coil 1 and are designed here as saddle coils, of which only one is directly visible in the manner of representation of FIG. 1 and is schematically represented by the dotted lines 5 and 6, the axis 7, common to the two further coils 4, running essentially perpendicular to the circumference and to the axis 8 of the first coil 1.

The construction of the coil arrangement is furthermore made in such a way that the first coil 1 is wound in the usual way supportlessly on a winding mandrel and a plastic jacket 9 is subsequently injection-moulded around its circumference, thereby giving it special stability. In this plastic jacket 9, there are then directly formed two coil chambers 10 and 11, which are on the outside of the first coil 1 and diametrically opposite each other, designed in the form of channels in their cross-section and in which the two further coils 4 are accommodated and thereby at the same time united with the first coil 1 at the circumference, which is simply accomplished by the said further coils being wound into these coil chambers. In the present case, each coil chamber 10 and 11, respectively, thereby consists of two straight channel-shaped sections 12 and 13, which run parallel to the axis 8 of the first coil 1, and of two arcuate channel-shaped sections 14 and 15, which run concentrically to the first coil 1 and in each case connect the two ends of the sections 12 and 13 to each other. In this way, self-contained, open one end, channel-shaped coil chambers 10 and 11, respectively, are obtained, which have a saddle form, into which the further coils 4 are then wound, which in this way are designed as saddle coils. Furthermore, in the present case, the two straight channel-shaped sections 12 and 13 of each coil chamber 10 and 11, respectively, which sections run parallel to the axis 8 of the first coil 1, are formed, as evident in particular from FIG. 2, by channels which, in their cross-section, run in the form of secants to the first coil 1, designed as a cylinder coil, which is achieved by the lateral wall surfaces of the channels forming secants to the circumferential circle of the first coil 1 or respectively of the plastic jacket 9, the channel-shaped sections 12 and 13 then being completely open to the circumference of the plastic jacket 9. In this way, the plastic jacket 9, forming the coil chambers 10 and 11 and the sheathing for the first coil 1, designed as a cylinder coil, is particularly simple to produce with respect to the mould, regarding demouldability, and the further coils 4 to be accommodated in the coil chambers 10 and 11, respectively, are furthermore simple to wind. In actual fact, it would of course also be possible to bound the channel-shaped sections 12 and 13 partially with outer arcuate wall sections of the plastic jacket 9, this adjoining the outer wall sections which bound the arcuate channel-shaped sections 14 and 15. Another possibility would be, for example, if the magnet system interacting with the coil arrangement allowed it, to design at least one of the two channel-shaped sections 14 and 15, respectively, running not arcuately but likewise straight and in the form of a secant to the first coil 1, designed as a cylinder coil, this directly adjoining the straight channel-shaped sections 12 and 13, in which case a part of the winding of the further coil 4 to be accommodated in this section would then run in a self-supporting manner.

The coil arrangement according to the present exemplary embodiment consequently has, on account of the plastic jacket 9 provided, very good stability and is also not prone to damaging effects. Due to the fact that coil chambers for the further coils are formed directly in the plastic jacket, no further operation for the circumferential attaching of the further coils to the first coil, such as for example an adhering operation, is necessary, since the further coils can be wound directly into the coil chambers provided for them. Furthermore, due to the fact that the first coil is designed as a cylinder coil and the two further coils are designed as saddle coils, a very compact construction is achieved, which allows a very good utilization of the air gap of the magnet system interacting with the coil arrangement. Such a coil arrangement is therefore very well suited for use in an optical scanner for the scanning of an information track on an optical recording carrier, in which use, for example, the coil arrangement connected to an adjustable mount for a lens system runs in the air gap of a magnet system and a focusing of the lens system on the information track takes place with the first coil and a setting of the lens system to the track centre takes place with the two further coils. In this way, good setting properties of the optical scanner to an information track are obtained, the optical scanner itself being very simple in terms of its construction and operationally reliable and good to produce.

It goes without saying that the measures described above are not restricted to the application of a first coil designed as a cylinder coil but can also be applied, for example, to a supportlessly wound first coil which is designed rectangularly in cross-section perpendicular to its coil axis. The same also applies correspondingly to the design of the further coil or the design of the coil chamber which is formed in the plastic jacket and in which a further coil is accommodated. For example, such a coil chamber could also be designed in such a way that it only partially embraces or supports the coil to be accommodated in it sectionally at a number of points, this being in the manner of a spoke-shaped reel. As evident, a number of possibilities of modifying the exemplary embodiment described above, without thereby departing from the scope of the invention, consequently exist.

Figure 3:
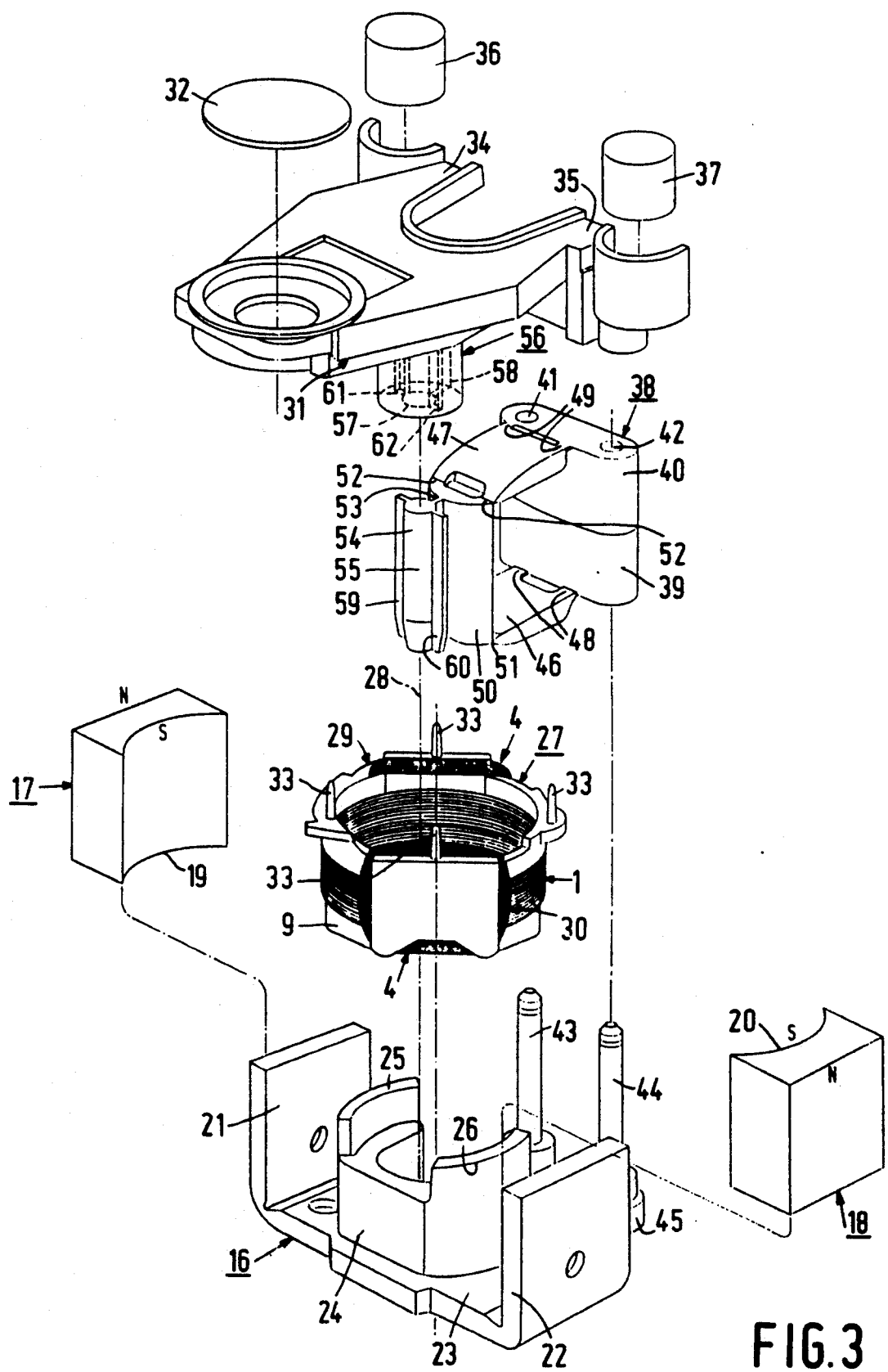
FIG. 3 shows, in an exploded representation, an optical scanner which uses a coil arrangement according to FIGS. 1 and 2.

The optical scanner shown in FIG. 3 has a U-shaped bracket 16, which consists of soft-magnetic material and serves as a mount for the magnet system. In the present case, the magnet system consists of two right-parallelepipedal magnets 17 and 18, which have cylindrically shaped pole faces 19 and 20. These magnets 17 and 18 face each other with their pole faces 19 and 20, each assembled on one of the two limbs 21 and 22 of the U-shaped bracket 16, the magnets being magnetized in the direction of the course of the cross-piece 23 of the U-shaped bracket 16 and like poles of the two magnets facing each other. Between the magnets 17 and 18, there is attached on the cross-piece 23 of the U-shaped bracket 16 a return part 24 for the magnet system, which part likewise consists of soft-magnetic material, is designed in the form of a hollow cylinder and has sections with cylindrical circumferential surfaces 25 and 26, which lie at a distance from the pole faces 19 and 20 of the magnets 17 and 18, as a result of which an air gap is formed, which is permeated by the lines of force of the magnets 17 and 18. In the assembled state of the optical scanner, this air gap of the magnet system is entered by the coil arrangement 27 designed in accordance with the exemplary embodiment of FIGS. 1 and 2, which arrangement consists of a cylinder coil 1 and two further coils 4, which are designed as saddle coils, which lie diametrically opposite each other, one each of the two strands 29 and 30, respectively, of the two coils 4 running parallel to the axis 28 of the coil arrangement 27 lying directly opposite a pole of the magnets 17 and 18, respectively, as a result of which a turning moment is exerted on the coil arrangement 27 and the latter is consequently turned, when a current flows through the coils 4. In an analogous way, the coil arrangement 27 is adjusted in the direction of the axis 28 of the coil arrangement 27 when a current flows through the cylinder coil 1.

The coil arrangement 27, is, for its part, connected to a plate-shaped mount 31, which is adjustable in a special way, for the lens system of the optical scanner, here consisting of a lens 32, which in the present case is simply accomplished by four pins 33 being injection-moulded at offset angles onto the plastic jacket 9 of the coil arrangement 27, which pins run in the direction of the axis 28 of the coil arrangement 27, are inserted into corresponding bores (not visible here) on the mount 31 and are then welded ultrasonically to the mount 31. In order to balance the weight of the lens 32, jutting out in relation to the axis 28 of the coil arrangement 27, two counterweights 36 and 37, here designed in the form of cylinders, are attached to two arms 34 and 35 jutting out from the mount 31 in the opposite direction to the lens 32, as a result of which no tilting moment is exerted on the mount 31 with respect to an axis running through it transversely to the axis 28 of the coil arrangement 27 and parallel to a perpendicular to the poles of the two magnets 17 and 18.

For setting the lens system of the optical scanner, formed by the lens 32, to an optical recording carrier, the mount 31 must be able to perform two movements, namely, on the one hand, a distance setting of the lens system in relation to the optical recording carrier for focusing on an information track on the same and, on the other hand, a pivoting movement in a direction transverse to the information track concerned for setting to its track centre. This means that the mount 31 is to be arranged in such a way that it can perform, on the one hand, an adjusting movement in the direction of the axis 28 of the coil arrangement 27 and, on the other hand, a turning movement about the axis 28 of the coil arrangement 27. In order to achieve this, a holder 38 is provided for the mount 31, which holder has two basic parts 39 and 40, which lie one on top of the other, seen in the axial direction of the coil arrangement 27, and in which through-bores 41 and 42 are provided, which lie correspondingly to two pins 43 and 44, which for their part are arranged on an extension 45 which juts out from the cross-piece 23 of the U-shaped bracket 16 and onto which the basic parts 39 and 40 can be jointly fitted. From each of the basic parts 39 and 40 there juts out an arm 46 and 47, respectively, which runs transversely to the axis 28 of the coil arrangement 27 and is pivotally connected to the respective basic part concerned 39 or 40, by means of at least one strip-shaped film hinge 48 or 49, respectively, in the present case two such film hinges each being provided. The jutting-out ends of the arms 46 and 47 are for their part connected to each other by means of a cross-piece 50 running parallel to the axis 28 of the coil arrangement 27, this again being by means of at least one strip-shaped film hinge 51 or 52, respectively, here too in the present case two such film hinges again being provided each. In this way, a guide in the manner of a swing bridge is obtained for the cross-piece 50, by which swing bridge the cross-piece 50 is adjustable in the direction of the axis 28 of the coil arrangement 27. Furthermore, a supporting journal 54, which runs parallel to the cross-piece 50 and the axis 28 of the coil arrangement 27 and here is cylindrically designed, is connected to the cross-piece 50 by means of at least one strip-shaped film hinge 53, in the present case again two such film hinges are provided, in which arrangement, in the assembled state of the optical scanner, the axis 28 of the coil arrangement 27 passes through the film hinge 53 or here the two film hinges 53. In this way, the supporting journal 54 is pivotable about the axis 28 of the coil arrangement 27, its own axis 55 running at a distance parallel to the axis 28 of the coil arrangement 27. Seen overall, consequently the supporting journal 54 is, on the one hand, adjustable together with the cross-piece 50 in the direction of the axis 28 of the coil arrangement 27 and, on the other hand, pivotable all by itself about the axis 28 of the coil arrangement 27 and consequently able to perform the movements necessary for the adjustable mount 31. For connection of the holder 38 to the mount 31, a sleeve-shaped extension 56 is provided on the mount 31, which extension has an axial bore 57, which is indicated by dashed lines and into which a circumferential slit 58 opens out. The supporting journal 54 can be fitted into this bore 57, the two film hinges 53 then coming to rest inside the slit 58. In this way a protection against twisting can be brought about, for example by lateral ribs 59 and 60, provided on the supporting journal 54, and corresponding channels 61 and 62 in the region of the bore 57 in the extension 56 of the mount 31.

The assembly of the optical scanner takes place essentially by firstly the supporting journal 54 of the holder 38 being inserted into the bore 57 provided in the extension 56 of the mount 31 and consequently the holder 38 being connected to the mount 31. Hereupon, the basic part 39 of the holder 38 is swung away from the basic part 40 and the coil arrangement 27 is pushed over the basic part 39 and the arm 46 over the cross-piece 50 and the supporting journal 54 thereupon. Thereafter, the pins 33 of the coil arrangement 27 are inserted into the corresponding bores on the mount 31 and welded ultrasonically to the mount 31. In this way, the mount 31 supporting the lens 32, the coil arrangement 27 and the holder 38 then form a structural unit. Following this, the basic part 39 of the holder 38 is swung again towards the basic part 40 and then the basic parts 39 and 40 are mounted jointly on the pins 43 and 44, whereby the coil arrangement 27 comes to rest correctly in the air gap of the magnet system formed by the magnets 17 and 18. By feeding electric control signals on the one hand to the cylinder coil 1 and on the other hand to the further coils 4 of the coil arrangement 27, consequently the mount 31 supporting the lens 32 is, on the one hand, adjustable in the direction of the axis 28 of the coil arrangement 27 and, on the other hand, pivotable about the axis 28 of the coil arrangement 27, whereby the lens 32 can both be focused with respect to its distance on an information track on a recording carrier and pivoted towards the track centre of the latter.

It goes without saying that optical scanners which use a coil arrangement of the type in question here could also be constructed differently, in particular regarding their functional principle, for example to the extent that they operate with a stationary coil arrangement and a moving magnet system.

I claim:

1. A coil arrangement for an optical scanner, said arrangement having a supportlessly wound first coil having a circumference and at least one further coil, attached to said circumference, said further coil having an axis which runs essentially perpendicular to the circumference of the first coil, characterized in that a plastic jacket is injection-molded around the circumference of the supportlessly wound first coil, at least one coil chamber being formed in the plastic jacket the outside in relation to the first coil, and said chamber includes at least one channel-shaped section, said further coil being accommodated in said chamber.

2. The coil arrangement according to claim 1, characterized in that said first coil is designed as a cylinder coil and said further coil is designed as a saddle coil.

3. The coil arrangement according to claim 2, characterized in that said coil chamber for the further coil has two straight channel-shaped sections, which run parallel to the axis of said first coil and are formed by channels which in cross-section form secants to said cylinder coil.

4. An optical scanner for scanning an information track on an optical recording carrier, provided with a coil arrangement according to claim 1.

* * * * *